Figure 1:
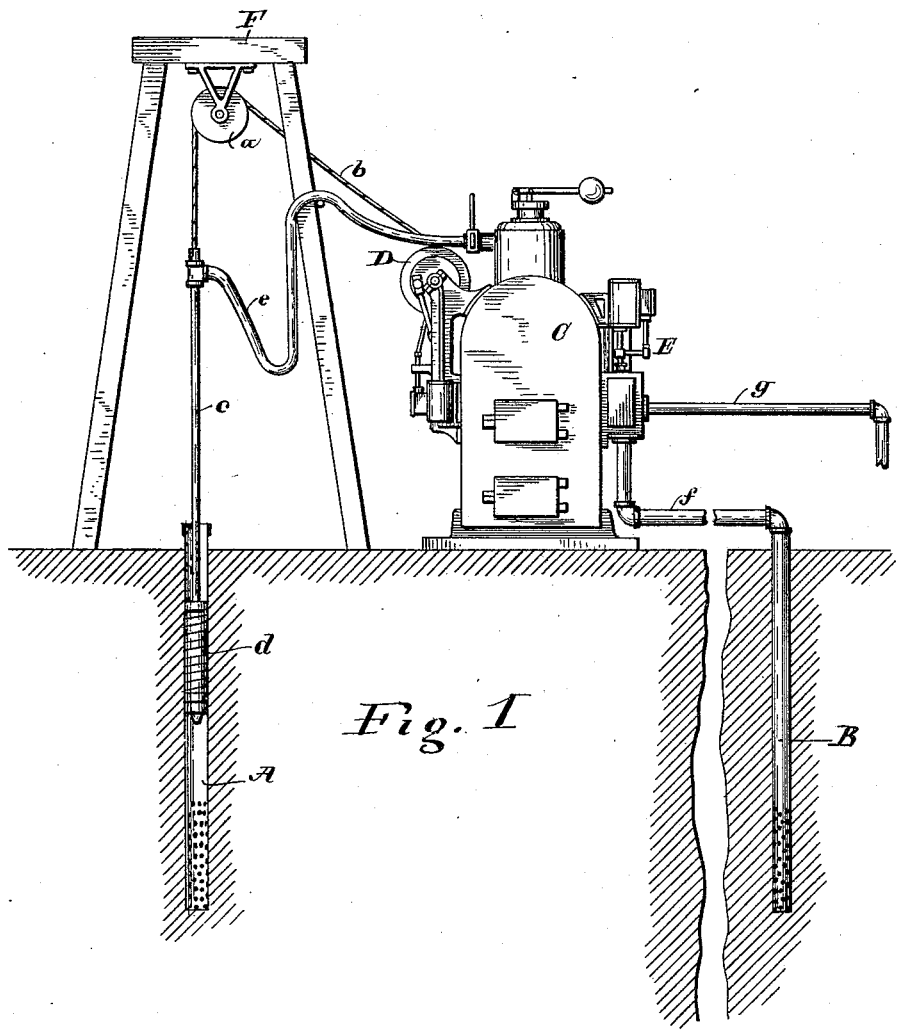

(No Model.) 2 Sheets—Sheet 2.

C. MONJEAU.
PROCESS OF FORMING SUBTERRANEAN FILTERING GALLERIES.

No. 461,445. Patented Oct. 20, 1891.

Witnesses:
J. A. Lynch
E. Hosea

Inventor
Cleophas Monjeau
per
R. W. Hosea
Attorney.

UNITED STATES PATENT OFFICE.

CLEOPHAS MONJEAU, OF MIDDLETOWN, OHIO.

PROCESS OF FORMING SUBTERRANEAN FILTERING-GALLERIES.

SPECIFICATION forming part of Letters Patent No. 461,445, dated October 20, 1891.

Application filed January 19, 1891. Serial No. 378,252. (No model.)

*To all whom it may concern:*

Be it known that I, CLEOPHAS MONJEAU, a citizen of the United States, residing at Middletown, in the county of Butler and State of Ohio, have invented new and useful Improvements in Processes of Forming Subterranean Filtering-Galleries, of which the following is a specification.

My invention relates to a method and means of cleansing and enlarging the subterranean supply areas of tube-wells, the object being to increase and purify the supply of water obtainable therefrom. In the ordinary construction and use of such wells the pumping-tube is sunk into the earth by well-known means, and, when fitted with a strainer, constitutes the pump-terminal, deriving its supply of water from the immediately-contiguous area, into which water percolates from the surrounding formation, the infiltration being more or less retarded by the sedimentary matters, which to some extent are gradually drawn toward the pump-terminal and tend to obstruct the same. Beyond the effect of the preliminary pumping in removing a limited quantity of the mud, silt, &c., from the immediate vicinity of the strainer, the formation constituting the supply area remains in its original condition, the force of the percolating currents being insufficient, except in a very limited degree, to dislodge the sedimentary and other impurities.

My invention seeks to practically create in the earth an enlarged reservoir and filtering-bed free from surface contaminations surrounding the pump-terminal, and is accomplished by heating and agitating the formation embraced in such areas and pumping out the sedimentary detritus dissolved or mechanically suspended in the water. The process by which this is preferably accomplished involves the injection of steam, preferably in connection with a hammer reciprocated in the well-tube, so that by loosening effects of expansion, by heating and the subsequent contraction by cooling, and the solvent action of heat and water, and the forcible dislodgment and attrition of solid particles by jarring blows the sand or gravel in an enlarged area about the mouth of the pipe is cleansed of silt, mud, and other contaminating matters, which are removed by pumping, thereby ultimately securing a more abundant supply and a purer quality of water.

As incidental advantages of my improvement, the water obtained is "softer"—that is, more free from particles of lime, &c., on which its quality of hardness depends—and the water is also purified and softened by the aeration, which is a continuing incident of the invention, and pumping is facilitated by the free access of atmospheric pressure to the supply area.

My invention is illustrated in the accompanying drawings, in which—

Figure 2:
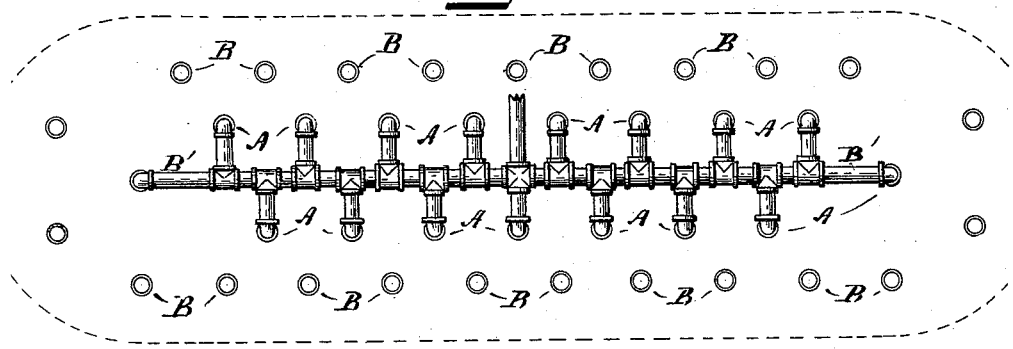
Figure 3:
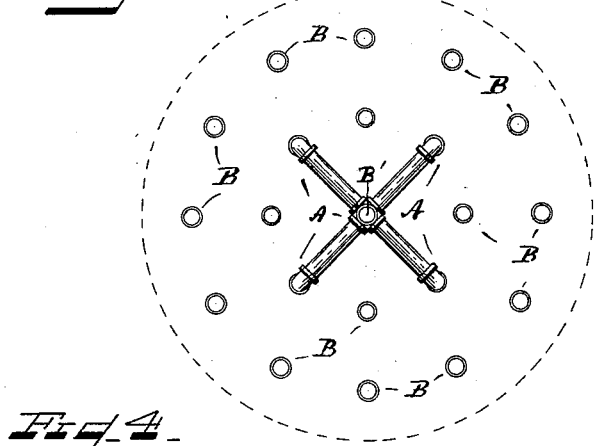
Figure 4:
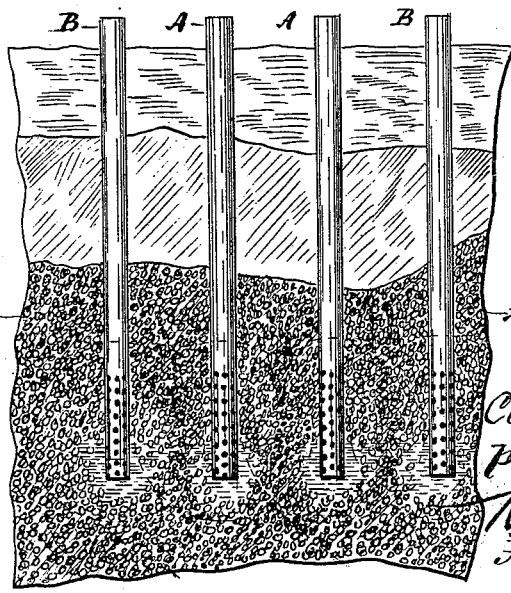

Figure 1 is a general view of the apparatus used in carrying out my invention; Figs. 2 and 3, plan diagrams illustrating the arrangement of a series of tubes and pump-terminals in respect to a given supply area; and Fig. 4, a supposed section across a subterranean area, showing the relation of the pump-terminals and the auxiliary tubes.

Referring now to the drawings, Fig. 1, A designates a tube-well sunk by any well-known means into the earth to a water-bearing stratum or pocket, and B an auxiliary tube similarly inserted at a convenient distance.

C designates a steam-boiler provided with a steam-windlass D and a pump E, and F designates a staging or "derrick" having a suspended idler-sheave $a$, over which plays a rope or chain $b$, controlled by the windlass D. To the end of the rope $b$ is attached a section of pipe $c$, at the lower end of which is attached a weighted head $d$, which acts as a loose piston in the tube A, in which it is here shown. The pipe $c$ opens below through the piston-head $d$, and its upper end is connected with the boiler by and receives steam therefrom through a flexible steam-hose $e$. The pump E is provided with connecting-pipe $f$ and attachments for ready application to the upper mouth of any of the pipes, such as A or B, when sunk into the earth.

The operation is as follows: The tube A (which I may suppose to be intended as the ultimate service-tube or pumping-terminal) being sunk into the earth, the water-hammer D and its steam-pipe $c$ are inserted therein, connected with the boiler by the flexible supply-pipe $e$ and suspended by the rope $b$, passing over the pulley $a$ to the windlass D.

Steam being permitted to flow into the tube A is condensed by the water, and the earth formation contiguous to the lower mouth of the tube is heated. The water-hammer $d$ is then repeatedly elevated by the windlass above the level of the water in the tube and allowed to drop, and by its weight strikes the water with considerable force, producing an artificial water-ram, the shock of which is readily transmitted throughout an expanded supply area $x$, surrounding the lower mouth of the tube, and jars and displaces the solid particles. The surrounding formation suffers a disintegrating expansion by the heat, which thus forms concentering channels or spaces in the water-bearing strata and also materially assists the solvent action of the water, and through these combined effects, together with the jarring and loosening effects of the blows of the hammer, a large proportion of the mud, silt, &c., is dissolved by or mechanically suspended in the water. While in such condition the hammer $d$ and steam connections are removed and the pump connection $f$ attached to the pipe A and the water rapidly pumped out, taking with it the dissolved and suspended detritus. The exhaustion of the heated water causes the colder water to flow in from the surrounding formation, causing a contraction, which further assists the dislodgment and attrition of solid particles by which the cleansing action of heat and water are facilitated. Frequent repetition of this process extends the area of its effect and more thoroughly cleanses the earth formation in such area.

It will be readily understood that the jarring action of the water-hammer, transmitted in all directions through the water-bearing formation surrounding the tube-mouth, the constituent elements of which are already loosened by heat expansion, produces an attrition of solid particles and assists the removal of the intervening binding material, which to a greater or less extent prevents the free percolation of water, and thereby and by the removal of such detritus is formed an enlarged artificial reservoir or filtering-pocket, which gives an increased and purer supply.

In order to still further enlarge the supply area as a means of securing a more abundant supply of water I proceed to sink one or a number of supplemental tubes B at convenient distances from the main tube A. The arrangement of the pump-main and auxiliary tubes may be as illustrated in Figs. 2 and 3, in which the pump-main B' ramifies into a number of terminals A, all sunk in the earth in due relation to a given supply area, which may be a longitudinally-extended "filtering-gallery," as indicated in Fig. 2, or concentric, as indicated in Fig. 3, while the auxiliary tubes B are sunk at distributed points about the same. The procedure is as follows: The initial pumping-terminal A and its immediately-contiguous area having been treated as hereinbefore described, a tube B, Fig. 2, is sunk and the heating, dislodging, and pumping process is applied thereto, the pump E being ultimately connected to the tube A, while the steaming or hammer is operating in the tube B to produce a defined current between the two. The water thus heated is transmitted through the intervening earth. The tubes B and A are located sufficiently near together to practically merge their areas of cleansing effect, and the processes described having been repeated for each new auxiliary tube there is thus constituted an enlarged filtering-bed, (indicated by the dotted circle, Fig. 3, or between the dotted lines, Fig. 2.)

It will be understood that any number of steam-hammers $d$ may be put to use simultaneously in auxiliary tubes surrounding a given terminal B, and the desired effect thus more expeditiously and thoroughly produced. I may also in lieu of steam force hot water or cold water under pressure through an auxiliary tube while pumping from a contiguous one, thereby obtaining a "slushing" effect upon the intervening gravel or solid particles assisted by the heat expansion produced where heat is used.

The auxiliary tubes are left in place suitably capped and screened, and thus allow air to freely enter the drainage area or filtering-bed as water is exhausted therefrom with two beneficial results—namely, the free communication of external atmospheric pressure directly to the water-surface of the subterranean supply-reservoir facilitates the pumping of water from such reservoir, and the free communication of atmospheric air also exercises a purifying effect and softens the water. The relative positions of the tubes are indicated in the sectional view, Fig. 4, being a supposed section of the earth indicating the strata overlying the water-bearing formation.

The operations hereinbefore described may be repeated from time to time subsequently as the tubes remain permanently in position, so that the filtering-beds may be cleansed afresh.

In strata deficient in amount of water the process here described results in the production of an enlarged reservoir for the accumulation of water in greater quantity near the suction-terminal, and thereby practically increases the available supply.

I claim as my invention and desire to secure by Letters Patent of the United States—

1. The process of cleansing and enlarging the subterranean supply areas of tube-wells and facilitating the removal of sedimentary matter and other impurities therefrom, consisting in forcibly agitating, dislodging, and producing attrition of the solid matters in such area and pumping out the water in which sedimentary impurities are dissolved or suspended as a consequence of such action, substantially as set forth.

2. The process of cleansing and enlarging the subterranean supply area of a tube-well and facilitating the removal of sedimentary impurities therefrom, consisting in heating the formation included in said area and forcibly agitating the solid matters to assist the dislodgment, solution, and suspension of impurities, and then pumping out the water containing the same, substantially as described.

3. The process of enlarging the subterranean supply area of tube-wells and facilitating the removal of sedimentary impurities therefrom, consisting in forcibly agitating the solid matters in such area by a sudden compression of the water therein distributed outward through the fluid medium, substantially as set forth.

4. The process of enlarging the subterranean supply area of a tube-well and increasing the supply of water obtainable therefrom, consisting in sinking one or more auxiliary tubes in proximity to a main tube and through and by means of said tubes introducing and communicating jarring and dislodging force to the solid matters contiguous to the mouths of said tubes and in the intervening area to facilitate the solution and suspension of silt and other impurities and pumping out the water so charged, substantially as set forth.

5. The process of increasing and purifying the water-supply of a tube-well, consisting in providing one or more independent auxiliary tubes sunk into the supply area of the main tube to supply air as water is removed from said area, substantially as set forth.

6. The process of enlarging the supply area of tube-wells by sinking one or more auxiliary tubes around and in proximity to the main tube and through and by means of said auxiliary tubes introducing and communicating a jarring and dislodging force to the solid matters of the intervening subterranean formation, admitting water through said auxiliary tubes when necessary, and pumping out the water charged with the dissolved impurities through the main tube, substantially as set forth.

7. The process of cleansing the subterranean supply areas of tube-wells and creating filtering-beds contiguous to the supply-mouths of such tubes, consisting in heating and forcibly agitating the contiguous formation and by the solvent action of heat and the mechanical intermovement or attrition of solid particles in such areas dislodging the contained mud, silt, and other impurities and causing the same to be taken up by the water, and then pumping out the water, substantially as set forth.

8. The process of producing subterranean filter beds or galleries, consisting in heating, stirring, and dissolving by the direct application of steam, subterranean areas of water-bearing sand, gravel, silt, clay, &c., into thin mud through or by means of tubes and quickly pumping up said thin mud, and repeating the operation until such mud is exhausted and the subterranean water space or reservoir of required extent is cleansed of sediment and other objectionable substances for the supply of pure water, substantially as set forth.

In testimony whereof I have hereunto set my hand in the presence of two subscribing witnesses.

CLEOPHAS MONJEAU.

Witnesses:
   L. M. HOSEA,
   E. HOSEA.